United States Patent
Suzuki (10) Patent No.: US 8,532,980 B2
(45) Date of Patent: Sep. 10, 2013

(54) DOCUMENT PROOFING SUPPORT APPARATUS, METHOD AND PROGRAM

(75) Inventor: Hirokazu Suzuki, Machida (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 535 days.

(21) Appl. No.: 12/887,624

(22) Filed: Sep. 22, 2010

(65) Prior Publication Data

US 2011/0238411 A1    Sep. 29, 2011

(30) Foreign Application Priority Data

Mar. 29, 2010  (JP) ................................. 2010-076047

(51) Int. Cl.
*G06F 17/27* (2006.01)

(52) U.S. Cl.
USPC ............... 704/9; 704/1; 704/2; 704/3; 704/8; 704/10; 707/706; 707/707; 707/708; 715/264

(58) Field of Classification Search
USPC ............... 704/1–10; 707/706–708; 715/264
See application file for complete search history.

(56) References Cited

U.S. PATENT DOCUMENTS

| | | | | |
|---|---|---|---|---|
| 5,023,786 A | * | 6/1991 | Kugimiya et al. | 704/4 |
| 5,075,851 A | * | 12/1991 | Kugimiya et al. | 704/6 |
| 5,161,105 A | * | 11/1992 | Kugimiya et al. | 704/4 |
| 5,642,522 A | * | 6/1997 | Zaenen et al. | 715/246 |
| 5,963,893 A | * | 10/1999 | Halstead et al. | 704/9 |
| 6,014,615 A | * | 1/2000 | Chen | 704/3 |
| 6,073,146 A | * | 6/2000 | Chen | 715/264 |
| 6,965,857 B1 | * | 11/2005 | Decary | 704/9 |
| 7,451,076 B2 | * | 11/2008 | Nakamura et al. | 704/7 |
| 7,715,631 B2 | * | 5/2010 | Tanaka et al. | 382/190 |
| 7,899,666 B2 | * | 3/2011 | Varone | 704/9 |
| 2003/0145285 A1 | * | 7/2003 | Miyahira et al. | 715/533 |
| 2004/0093567 A1 | * | 5/2004 | Schabes et al. | 715/533 |
| 2004/0267537 A1 | * | 12/2004 | Nakamura et al. | 704/276 |
| 2006/0039607 A1 | * | 2/2006 | Tanaka et al. | 382/190 |
| 2006/0224581 A1 | * | 10/2006 | Sasai | 707/5 |
| 2007/0213974 A1 | * | 9/2007 | Xu | 704/9 |
| 2007/0260451 A1 | * | 11/2007 | Yanagisawa | 704/10 |
| 2008/0077859 A1 | * | 3/2008 | Schabes et al. | 715/257 |
| 2008/0275694 A1 | * | 11/2008 | Varone | 704/9 |
| 2008/0288243 A1 | * | 11/2008 | Kobayashi | 704/9 |
| 2011/0119049 A1 | * | 5/2011 | Ylonen | 704/9 |

FOREIGN PATENT DOCUMENTS

JP    2001-249921    9/2001

* cited by examiner

*Primary Examiner* — Lamont Spooner (74) *Attorney, Agent, or Firm* — Ohlandt, Greeley, Ruggiero & Perle, L.L.P.

(57) ABSTRACT

According to one embodiment, a document proofing support apparatus includes an input unit, an analysis unit, a detection unit, a database unit, a retrieval unit, and a display unit. The input unit is configured to receive input of one of at least one proof document and at least one entry document. The analysis unit is configured to perform a morphological, a syntactic and a dependency analysis and generate analysis information including a dependency relation. The detection unit is configured to detect as a possible coined word character string a compound word having a nominal continuation relation. The database unit is configured to store syntactic information. The retrieval unit is configured to retrieve a dependency-relation sentence, and to determine the possible coined word character string as a coined word if the dependency-relation sentence exists. The display unit is configured to display a message including the coined word.

11 Claims, 3 Drawing Sheets

| ID | Morphological information | Syntax and dependency information |
|---|---|---|
| 001 | ナトリウム(noun)/漏えい(*sa-hen* noun)/が(particle)/漏えい(*sa-hen* noun)/検出器(noun)/で(particle)/検出(*sa-hen* noun)/さ(verb)/れ(auxiliary verb)/た(auxiliary verb)/場合(suffix-like noun)/、/運転(noun)/員(suffix)/は(particle)/炉(noun)/を(particle)/速やか(adjective verb)/停止(*sa-hen* noun)/さ(verb)/せ(auxiliary verb)/。(punctuation mark) | \<main\>停止<br>　\<josi\>せ\</josi\><br>　\<wo\>炉\</wo\><br>　\<fkph\>速やか\</fkph\><br>　\<ags\>員<br>　　\<rengo\>運転\</rengo\><br>　\</ags\><br>　\<juzok\>場合<br>　　\<jzks\>検出<br>　　　\<inst\>検出器<br>　　　　\<rengo\>漏えい\</rengo\><br>　　　\</inst\><br>　　　\<wo\>漏えい<br>　　　　\<rengo\>ナトリウム\</rengo\><br>　　　\</wo\><br>　　\</jzks\><br>　\</juzok\><br>\</main\> |
| | Original sentences | Proof information |
| | ナトリウム漏えいが漏えい検出器で検出された場合、運転員は炉を速やかに停止させる | Undone |
| | | |

FIG. 3

| Index | ID |
|---|---|
| ナトリウム | 001/004/010… |
| 漏えい | 001/007/… |
| … | … |
| 炉 | 001/023 |
| 停止 | 001/002/058 |

DOCUMENT PROOFING SUPPORT APPARATUS, METHOD AND PROGRAM

CROSS-REFERENCE TO RELATED APPLICATIONS

This application is based upon and claims the benefit of priority from Japanese Patent Application No. 2010-076047, filed Mar. 29, 2010; the entire contents of which are incorporated herein by reference.

FIELD

Embodiments described herein relate generally to a proofing support system for technical documents, having a coined word detection function.

BACKGROUND

Technical documents such as reports, papers and patent applications created by an engineer may be translated into another language by a translator who is not expert in the field. When a compound word (coined word or industry jargon) used by the document author is translated, the meaning or indication of the word may be clear to the expert who have written the document, but, without technical knowledge that provides the premise of the word usage, the translator may not know how to translate it. In such a situation, a method may be adopted, with which corpus frequencies of the compound word and compound words containing partial word strings of the target compound word are examined, and a word with a low frequency is notified, with alert, as an infrequently used compound word or in other words, a coined word (see, for example, JP-A 2001-249921 (KOKAI)).

The translator, however, may still have difficulties in selecting appropriate words in the process of translation, by use of the corpus frequencies only. For instance, a compound word "事象抽出" which is coined from a noun "事象 (event)" and a sa-hen noun "抽出 (extraction)" may be used.

If the corpus frequency of the word "事象抽出" is greater than a predetermined threshold, this compound word would not be determined as a coined word. When a translator with little expertise has to translate the word "事象抽出" into a different language, for example, into English and it is assumed that the translations of "事象" and "抽出" are "event" and "extraction", it is difficult for the translator to determine whether the translation of "事象抽出" should be "event extraction", "extraction from an event" or "extraction of an event".

Furthermore, as a method of determining whether the compound word "事象抽出" is coined, a string search simply for two words "事象" and "抽出" or wild-card matching for "事象*抽出 (event*extraction)" can be considered. With such methods, however, word strings such as "事象データ系列抽出 (event data series extraction)" and "事象データにより関連性が抽出される (relevance extracted from event data)" would be found, and whether the compound word "事象抽出" is a coined word is difficult to determine based on these word strings. Because the translator cannot determine whether the term "事象抽出" is a coined word based on its frequency of use, processes of sending an inquiry to the author, receiving an answer from the author and proofing the original document are required. As a result, it may take a long period of time to complete the translation.

DETAILED DESCRIPTION

In general, according to one embodiment, a document proofing support apparatus includes an input unit, an analysis unit, a detection unit, a database unit, a retrieval unit, and a display unit. The input unit is configured to receive input of one of at least one proof document and at least one entry document, the proof document including one or more sentences that is to be subjected to a proofing process, the entry document including one or more sentences that is to be subjected to an entry process. The analysis unit is configured to perform a morphological analysis, a syntactic analysis and a dependency analysis on each of sentences included in the entry document and generate analysis information including a dependency relation that indicates a semantic connection between words, and to perform a morphological analysis on each of sentences included in the proof document and generate morphological analysis information. The detection unit is configured to detect as a possible coined word character string a compound word having a nominal continuation relation by referring to the morphological analysis information, the nominal continuation relation being a relation of two or more consecutive words that can be nouns. The database unit is configured to store syntactic information on a correspondence between a sentence included in the entry document and the analysis information. The retrieval unit is configured to retrieve whether or not a dependency relation sentence exists, the dependency relation sentence including component words of the possible coined word character string as case elements and having a dependency relation other than the nominal continuation relation between the component words, and to determine the possible coined word character string as a coined word if the dependency relation sentence exists. The display unit is configured to display a message including the coined word.

The document proofing support apparatus, method and program according to the embodiments will be explained in detail with reference to the attached drawings. In the following embodiments, components with the same reference numerals have the same functions, and repetition of the explanation is omitted.

Figure 1:
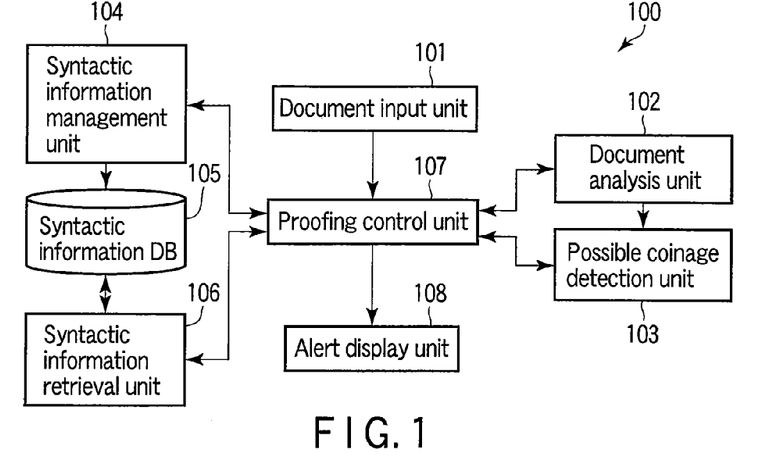
FIG. 1 is a block diagram of a document proofing support apparatus according to the present embodiment.

Next, the document proofing support apparatus according to an embodiment will be explained in detail with reference to FIG. 1.

A document proofing support apparatus 100 according to the embodiment includes a document input unit 101, a document analysis unit 102, a possible coined word detection unit 103, a syntactic information management unit 104, a syntactic information database (DB) 105, a syntactic information retrieval unit 106, a proofing control unit 107 and an alert display unit 108.

The document input unit 101 receives, when a document proofing process is performed, a document that is to be subjected to the proofing process, and when a document entry process is performed, the document input unit 101 receives a document that is to be subjected to the entry process. The document input as an entry document or a proof document may be a whole document or part of the document containing one or more sentences. The document may be written in Japanese or in any other language, such as Chinese, Korean, and French.

The document analysis unit 102 receives, When the document entry process is performed (or in other words, when an entry document is input to the document input unit 101), the entry document from the proofing control unit 107 which will be described later, and performs morphemic, syntactic, and dependency analyses on each sentence included in the entry document to generate analysis information for the sentences. The analysis information includes dependency relations that indicate semantic relations between words. For instance, a sentence "犬が歩く (a dog walks)" includes a dependency relation of a ga-case connection between words "犬 (dog)" and "歩く (walk)". Furthermore, when the document proofing process is performed (or in other words, when an proof document is input to the document input unit 101), the document analysis unit 102 receives the proof document from the proofing control unit 107, and performs a morphological analysis on each sentence of the proof document to generate morphological analysis information. Generally-used processes should be adopted for the morphemic, syntactic and dependency analyses, and thus the detailed explanation thereof is omitted here.

The possible coined word detection unit 103 receives, when the document proofing process is performed, the morphological analysis information of each sentence of the proof document from the document analysis unit 102, and detects any possible coined word character strings by referring to the morphological analysis information. A possible coined word character string is a compound word that contains two or more consecutive words that can be nouns (hereinafter, it may be referred to as a "compound having a nominal continuation relation"). Words that can be nouns include nouns and sa-hen nouns. Examples of sa-hen nouns is a word "処理 (process)", which is a noun but also becomes a verb "処理する (to process)" by adding "する (suru)" thereto. That is, Sa-hen nouns are a group of nouns that can be made into verbs by adding the suffix "suru (to do)."

The syntactic information management unit 104 receives, when the document entry process is performed, sentences of the entry document and their analysis information from the document analysis unit 102 by means of the proofing control unit 107 which will be described later, and performs control for making entries of the analysis information into the syntactic information database 105, which will be described later.

The syntactic information database 105 receives, when the document entry process is performed, the analysis information of each sentence in the entry document from the syntactic information management unit 104, and stores the sentences of the entry document and their analysis information as syntactic information. The syntactic information stored in the syntactic information database 105 will be discussed later with reference to FIG. 3.

The syntactic information retrieval unit 106 receives a possible coined word character string from the possible coined word detection unit 103 by means of the proofing control unit 107 which will be described later. Then, the syntactic information retrieval unit 106 performs a retrieval through the syntactic information stored in the syntactic information database 105 to determine whether there is any sentence (hereinafter, referred to as a "dependency relation sentence") that includes component words of the possible coined word character string as case elements and has a dependency relation other than a nominal continuation relation between the component words. If a dependency relation sentence is found, the syntactic information retrieval unit 106 determines the possible coined word character string as a coined word. The determination techniques regarding the case elements will be explained in detail later.

The proofing control unit 107 receives a proof document from the document input unit 101 when the document proofing process is performed, and an entry document from the document input unit 101 when the document entry process is performed. In the proofing process, the proofing control unit 107 receives a possible coined word character string from the possible coined word detection unit 103, and sends the possible coined word character string to the syntactic information retrieval unit 106 in response to a request therefrom. In addition, when the syntactic information retrieval unit 106 determines the possible coined word character string as a coined word, the proofing control unit 107 receives the coined word and the dependency relation sentence from the syntactic information retrieval unit 106. Thereafter, the proofing control unit 107 sends the coined word and the dependency relation sentence to the alert display unit 108 in response to a request from the alert display unit 108, which will be described later.

When an entry process is performed, the proofing control unit 107 receives the sentences of the proof document and their analysis information from the document analysis unit 102, and sends the sentences and the analysis information to the syntactic information management unit 104 in response to a request therefrom. The entry document input for the entry process may be extracted from a set of documents held on the Internet, or may be a document created by the user in the past or a written portion of a document now being created.

The alert display unit 108 receives the coined word and the dependency relation sentence from the syntactic information retrieval unit 106 by means of the proofing control unit 107, and displays them as an alert message. Example alert messages will be presented later.

Figure 2:
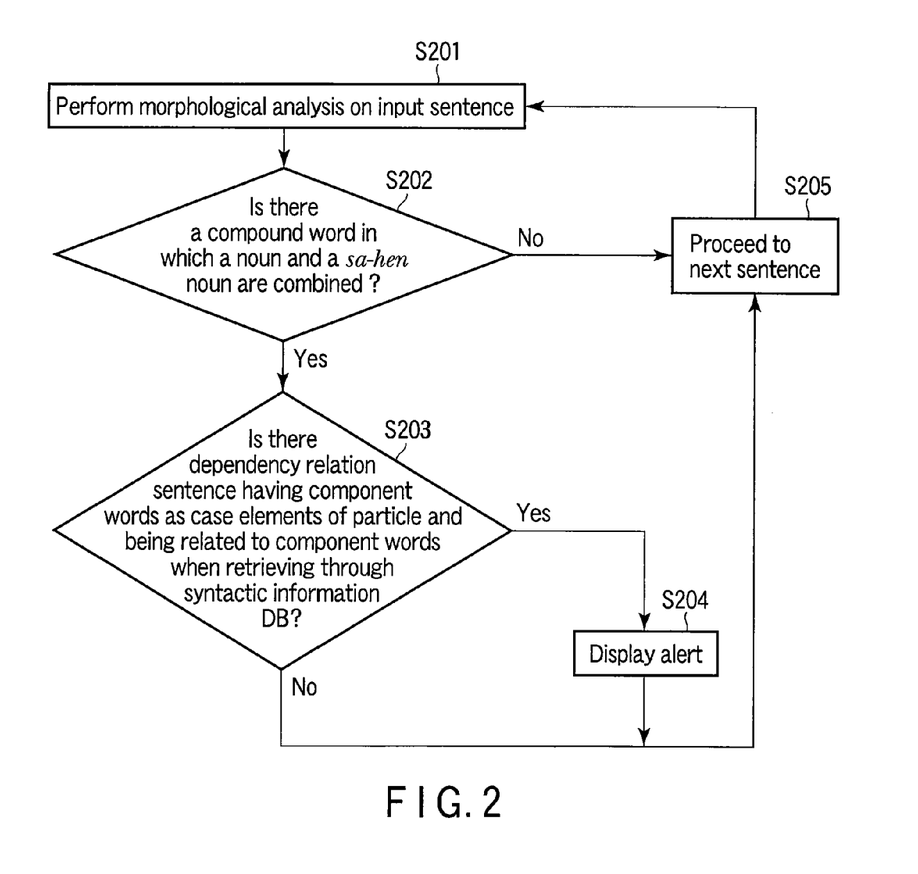
FIG. 2 is a flowchart of a coined word determination process performed by the document proofing support apparatus according to the embodiment.

Next, the coined word determination process performed by the document proofing support apparatus according to the present embodiment will be explained in detail with reference to the flowchart of FIG. 2. It is assumed here that the input document is written in Japanese.

In Step S201, the document analysis unit 102 performs a morphological analysis on each sentence of the proof document and generates analysis information.

In Step S202, the possible coined word detection unit 103 detects whether there is any possible coined word character string, by referring to the analysis information. It is assumed here that a possible coined word character string is a string that includes two words or more that are nouns or sa-hen nouns. If there is any possible coined word character string, the process proceeds to Step S203. If there is no possible coined word character string, the process proceeds to Step S205.

In Step S203, the syntactic information retrieval unit 106 conducts retrieval through the syntactic information database 105 to determine whether there is any dependency relation sentence related to component words of the possible coined word character string, in which the component words function as case elements of a particle such as ga-, wo- and no-cases. If a dependency relation sentence is found, it is determined that the possible coined word character string is a coined word, and the process proceeds to Step S204. If no dependency relation sentence is found, the process proceeds to Step S205.

In Step S204, the alert display unit 108 displays the coined word and the dependency relation sentence as an alert message, and notifies the user that the coined word is used.

In Step S205, the proofing control unit 107 reads the next sentence from the proof document, and the process returns to Step S201 so that the same process as the above can be performed on the sentence.

Here, the coined word determination process performed by the document proofing support apparatus according to the present embedment will be explained by use of a specific example.

It is assumed here that the coined word determination process is performed on the following Japanese sentence (1) as a sentence included in the proof document:

"崩壊熱は、燃料寿命末期 において、炉停止し
てから 1 時間後で約 0.4 MWt
である。(The decay heat at the end of fuel life
is approximately 0.4 MWt one hour after the
reactor is shut down)" (1)

When translating the phrase "炉停止してから 1 時間 後" in Japanese sentence (1), it is important to determine whether it indicates "one hour after somebody or something performs a shutdown operation for the reactor" or "one hour after the reactor comes to a stop" and to understand the semantic connection of the words, in order to accurately translate the technical meaning of this document. However, if the user is not knowledgeable about nuclear energy, it is difficult to judge the technical meaning. Thus, the document proofing support apparatus according to the present embodiment performs the coined word determination process.

First, the document analysis unit 102 performs a morphological analysis on Japanese sentence (1), the result of which is shown in (2):

"崩壊熱 (noun, decay heat)/は (particle)//
燃料寿命 (noun, fuel life)/末期 (noun, end)/
に (particle)/お (verb)/て (conjunctive particle)/、/炉 (noun, reactor)/停止 (sa-hen noun, shutdown)/する (verb)/て (conjunctive particle)/から (particle)/1 (numeral)/時間 (quantifier, hour)/後 (noun, after)/で (particle)/
約 (number prefix), approximately)/0.4 (numerals)/MWt (English unknown)/であ (auxiliary verb)/。(punctuation mark)" (2)

The symbol "/" represents the boundary of morphemes, and a format of "head word (word class)" is adopted.

Next, the possible coined word detection unit 103 detects any compound word that includes two consecutive words or more that are nouns or sa-hen nouns. In the example (2), "炉 (noun)/停止 (sa-hen noun)" corresponds to such a word, and therefore it is detected as a possible coined word character string.

Next, the syntactic information retrieval unit 106 retrieves from the syntactic information database 105 any sentence (dependency relation sentence) in which the component words "炉" and "停止" of the possible coined word character string "炉停止" received from the possible coined word detection unit 103 by means of the proofing control unit 107 serve as case elements for a particle such as a ga-, wo-, or no-case, and "炉" and "停止" establish some dependency relation in the document. It is assumed here that a dependency relation sentence (3) is found in relation to "炉" and "停止" in the syntactic information database 105:

"ナトリウム 漏えいが漏 えい検出器
で検出され た場合、運転員は炉 を速やかに
停止させる。(When sodium leakage is
detected by the leakage detector, the operator
should immediately shut the reactor down.)" (3)

In addition, it is assumed that the syntax and dependency information of the dependency relation sentence (3) as indicated in Table 1 is maintained in the syntactic information database 105.

Table 1

```
                          停止
                           |
      _____________________|_____________________
      |         |          |          |         |
     josi      wo        fkph        ags      juzok
      |         |          |          |         |
      せ        炉       速やか        員       場合
                                      |         |
                                    rengo     jzks
                                      |         |
                                     運転      検知
                                               |________
                                               |        |
                                             inst      wo
                                               |        |
                                             検出器   漏えい
                                               |        |
                                             rengo    rengo
                                               |        |
                                             漏えい  ナトリウム
``` josi: auxiliary verb phrase wo: wo-case fkph: adverb phrase ags: agent of verbal expression saseru rengo: combination of noun, adjective verb stem, symbol, numeral and the like in noun phrase juzok: dependent adverb phrase jzks: phrase accompanying dependent adverb phrase inst: instrumental case Table 1 is presented in a tree structure, by use of cases and head words that are obtained from the syntax and dependency information. By referring to Table 1, a wo-case dependency relation of "炉+ヲ (wo)+停止する" is detected. This means that two expressions "炉停止" and "炉を停止する" exist. More specifically, it can be determined that "炉停止" is an expression obtained by simplifying and nominalizing the expression "炉+ヲ (wo)+停止する" and that "炉停止" is a coined word. Thus, by referring to the analysis information generated from the syntactic analysis and the dependency analysis, an analysis can be made as to with which case elements the component words establish a dependency relation.

The coined word "炉停止" may establish a ga-case dependency relation of "炉 が (ga) 停止する", in addition to the wo-case dependency relation of "炉 を (wo) 停止する". Thus, when "炉停止" is determined as a coined word, the proofing control unit 107 presents an alert message including the coined word and the dependency relation sentence to the user. An example alert message is shown in Table 2.

TABLE 2

Coined word detected: "炉停止"
Usage in history: "ナトリウム漏えいが漏えい検出器で検出された場合 運転員は炉を速やかに停止させる。"

The underlined words in Table 2 show how the component words of the coined word are used in the dependency relation sentence. With the alert message of Table 2, the user can see in what dependency relation the compound word that is detected as a coined word has been used in the past, and can accurately understand the meaning of the coined word before translating it. The component words may not only be shown with underlined, but may also be shown in bold type, highlighted or blinked. The alert message can be displayed in any method with which the user can recognize. The message may be displayed in a different window on the screen on which the user is working, or in a pop-up window on the document. Furthermore, the alert message may be presented to the user not only in document but also by voice.

Figure 3:
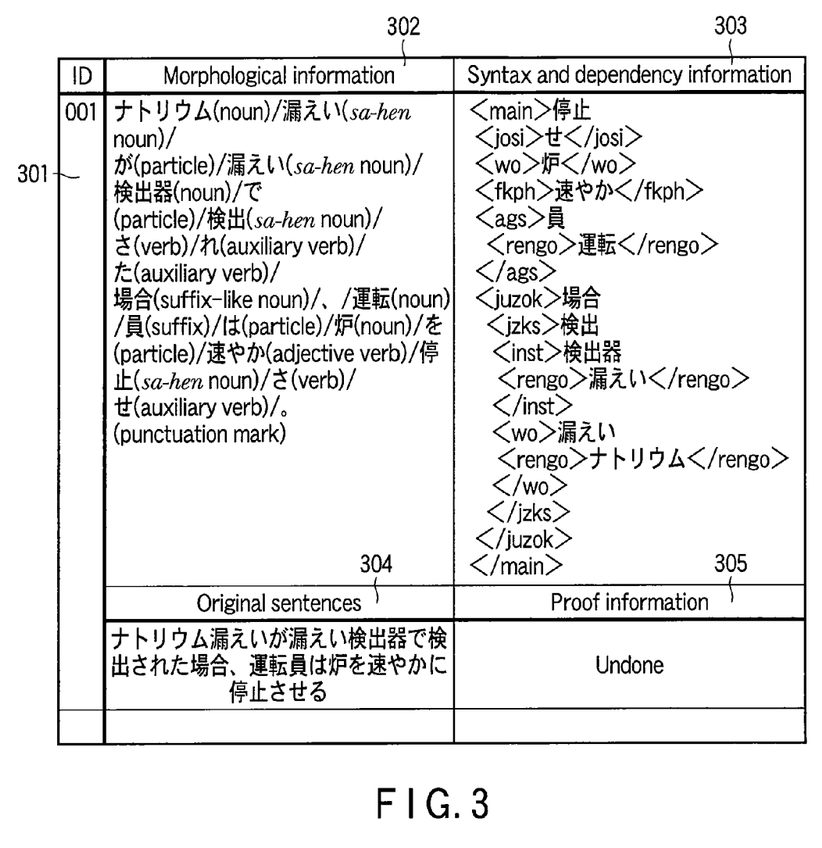
FIG. 3 is a diagram for showing an example of syntactic information stored in a syntactic information database.

Next, an example of the syntactic information stored in the syntactic information database 105 will be explained in detail with reference to FIG. 3.

In the syntactic information database 105, IDs 301, morphemic information 302, syntax and dependency information 303, original sentences 304 and proof information 305 are stored as syntactic information in association with one another. In FIG. 3, a unique ID 301 given for each original sentence 304, such as "ナトリウム漏えい が漏えい検出器 で検出された場合、運転員は炉を 速やかに停 止させる", is presented. Moreover, the morphemic information 302 obtained from the morphological analysis of the original sentence 304, the syntax and dependency information 303 obtained from the syntactic analysis and the dependency analysis of the original sentence 304, and the proof information 305 indicating whether the original sentence 304 has been proofed are presented.

In the proof information 305, the state of the original sentence being proofed is indicated as "done", and the state of the original sentence being not yet proofed is indicated as "undone". The method is not limited thereto. Whether or not the sentence has been proofed may be expressed by using a method with which the proofed state is determined when a flag is set. Any method with which whether or not the sentence is proofed is determined can be adopted. If the proof information 305 indicates "done" and the possible coined word character string is found in the proofed sentence, it can be considered that this possible coined word character string in the document has been subjected to the coined word determination process at least once. Thus, this string is not displayed as a coined word. In this manner, the resource of documents that have been proofed in the past can be effectively used.

Information regarding the document creation date, the author or the like may be added to the syntactic information so that further detailed information can be displayed on the alert display unit 108.

Figure 4:
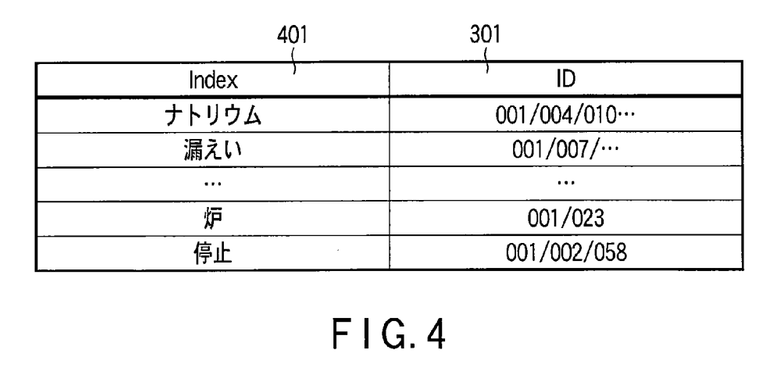
FIG. 4 is a diagram for showing an example of index table.

Next, an example of a retrieval performed for a dependency relation between words by the syntactic information retrieval unit 106 will be explained with reference to FIG. 4.

When the syntactic information retrieval unit 106 according to the present embodiment retrieves a dependency relation between component words of a possible coined word character string, an index table stored in the syntactic information database 105 is employed. In the index table, indexes 401 prepared from the morphemic information are associated with the IDs 301 of FIG. 3. To create the index table, the syntactic information management unit 104 extracts, after the syntactic information is created for each sentence of the entry document, the morphemic information 302 and the IDs 301 from the syntactic information. For example, when retrieving a dependency relation between the words "炉" and "停止", the indexes 401 for "炉" and "停止" are retrieved. If a common ID 301 is found, the dependency relation between these words can be obtained. In this example, the ID 301 of "001" corresponds to such an ID. By referring to the syntax and dependency information 303 included in the syntactic information of FIG. 3, the case element dependency relation between words can be obtained.

(Modification of Present Embodiment)

As a modification example of the present embodiment, the document proofing support apparatus according to the present embodiment applied not to a Japanese document but to a Chinese document will be discussed.

It is assumed as an example that a Chinese sentence (4) is included in the input proof document.

TABLE 3

| | |
|---|---|
| [AB Enterprise OS 启动模式变更(start mode change)] | (4) |

In the Chinese phrase of the above sentence, two interpretations can be considered as indicated in (5).

TABLE 4

| | |
|---|---|
| " 启动(start)" of " 模式变更(mode change)" OR " 变更(change)" in " 启动模式(start mode)" | (5) |

In the same manner as in the example of the Japanese technical document, a translator who is not an expert in this technical field may have difficulties when translating the sentence into a language other than Chinese, such as English.

When the above compound word should be detected as a coined word, the conventional method may be considered, with which the corpus appearance frequency of the compound word is checked and the word is determined as a coined word if the frequency is lower than or equal to a threshold. However, the Chinese language includes not only simple compound words but also "verb+noun" and "noun+verb" in sentences. It is therefore difficult to determine whether or not the compound word is a coined word, simply from the usage frequency of the word strings.

Alternatively, a method may be considered, with which the corpus appearance frequencies are checked for the following Chinese word strings, (6) to (9), the words with high frequencies are determined as partial compound words, and the Chinese sentence (4) is determined as a coined word that is generated by combining words other than the Chinese words (6) to (9).

TABLE 5

| | |
|---|---|
| 「模式变更(mode change)」 | (6) |
| 「启动模式(start mode)」 | (7) |
| 「启动(start)」 | (8) |
| 「变更(change)」 | (9) |

However, in the technical field of this sentence, which is computer technology, the above words have high corpus appearance frequencies, and therefore it is difficult to determine with this method whether or not the compound word is a coined word.

Figure 5:
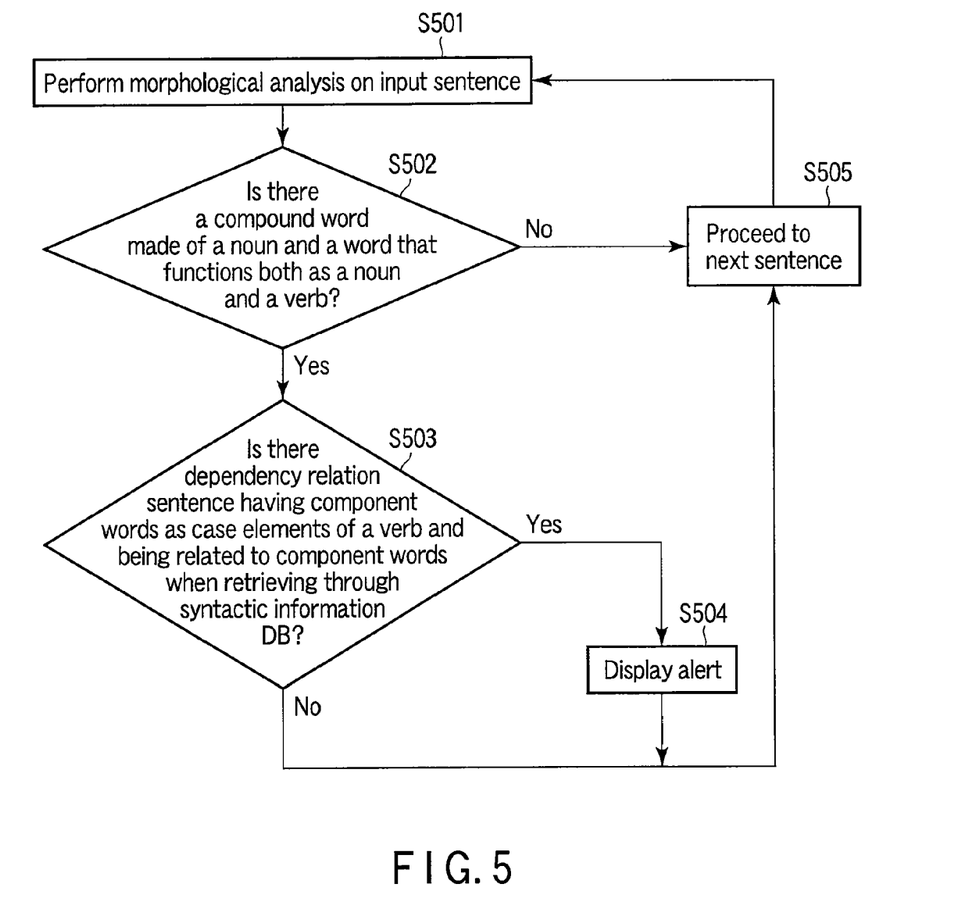
FIG. 5 is a flowchart of a coined word determination process performed by a document proofing support apparatus according to a modification example of the embodiment.

Here, the coined word determination process performed on a Chinese document by the document proofing support apparatus according to the present embodiment will be explained in detail with reference to the flowchart of FIG. 5. It is assumed here that the input sentence subjected to the coined word determination process is the Chinese sentence (4).

In Step S501, the document analysis unit 102 performs a morphological analysis on the input sentence.

In Step S502, the possible coined word detection unit 103 detects whether there is any possible coined word character string. It is assumed that the possible coined word character string according to the modification example is a compound word of two or more consecutive words which have two possible interpretations as nouns and as a noun+ a verb. If there is such a possible coined word character string, the process proceeds to Step S503. If there is no possible coined word character string, the process proceeds to Step S505. As a specific example, it is assumed that the possible coined word detection unit 103 detects a possible coined word character string from the Chinese sentence (4).

The Chinese word (8) can be interpreted as "start (noun)" and "to start (verb)". The next word " 模式 " of the sentence (4) is a noun. The Chinese word (9) can be interpreted as "change (noun)" and "to change (verb)".

Thus, the compound word of two consecutive words or more is detected as a possible coined word character string (10).

TABLE 6

| | |
|---|---|
| 「启动模式变更」」 | (10) |

In Step S503, the syntactic information retrieval unit 106 retrieves the syntactic information database 105 to determine whether there is a dependency relation sentence in relation to the component words of the possible coined word character string, in which the component words serve as case elements of a verb. If there is any dependency relation sentence, the possible coined word character string is determined as a coined word, and the process proceeds to Step S504. If there is no dependency relation sentence, the process proceeds to Step S505.

It is assumed here that a Chinese sentence (11) and the syntactic information obtained from the analysis of the sentence are stored in the syntactic information database 105.

TABLE 7

| | |
|---|---|
| 请按照说明书把启动模式变更为自动。 (Translation: Change the startup mode to automatic in accordance with the manual.) | (11) |

The underlined portion of the Chinese sentence (11) is identical to the possible coined word character string included in the target Chinese sentence (4). Moreover, the syntax and dependency information of the Chinese sentence (11) is indicated in Table 8.

Table 8

```
              变更
               |
    ___________|___________________
   |         |         |         |
  aux       advp      obj       iobj
   |         |         |         |
   请       按照       模式       自动
             |         |
             np       rengo
             |         |
           说明书      启动
``` aux: auxiliary verb
advp: preposition phrase modifying verbal or adjectival phrase
np: nominal phrase
obj: object that is essential case of verb
iobj: indirect object that is essential case of verb
rengo: indicating combination of noun, adjective verb stem, symbol, numeral and the like in nominal phrase By referring to the syntax and dependency information of Table 3, it is understood that the main verb is the Chinese word (9) and that the Chinese word (7) is a case element of the object (obj). Because the Chinese word (9) is a case element of the verb and the Chinese words (7) and (9) establish the "object-verb" dependency relation, it is determined that the possible coined word character string (10) is a coined word.

In Step S504, the alert display unit 108 displays the coined word and the dependency relation sentence and notifies the user that the coined word is used. An example alert message displayed by the alert display unit 108 is shown in Table 9.

TABLE 9

被查出新词了:「启动模式变更」
过去的用法:「请按照说明书把启动模式变更为自动。」

The display of the alert message may be performed with any method as long as the user can recognize the display, in the same manner as in the coined word determination process for a Japanese document.

According to the above embodiments, because the coined word determination is based on the dependency relation of the component words of a possible coined word character string that can be found in historical data of entry documents, coined words can be detected and suggested more accurately than detection and suggestion of coined words based on corpus frequencies in the original language. Furthermore, even when the component words appear in the same sentence in the history data of an entry document, if no dependency relation is found, the compound word is not recognized as a coined word. For this reason, the suggestion of a coined word can be conducted more flexibly and accurately than with a character string search or a wildcard search. Hence, the document proofing accuracy can be enhanced, and the working efficiency can be improved.

The flow charts of the embodiments illustrate methods and systems according to the embodiments of the invention. It will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instruction stored in the computer-readable memory produce an article of manufacture including instruction means which implement the function specified in the flowchart block or blocks. The computer program instructions may also be loaded onto a computer or other programmable apparatus to cause a series of operational steps to be performed on the computer or other programmable apparatus to produce a computer programmable apparatus which provides steps for implementing the functions specified in the flowchart block or blocks.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A document proofing support apparatus comprising:
an input unit configured to receive input of one of at least one proof document and at least one entry document, the proof document including one or more sentences that is to be subjected to a proofing process, the entry document including one or more sentences that is to be subjected to an entry process;
an analysis unit configured to perform a morphological analysis, a syntactic analysis and a dependency analysis on each of sentences included in the entry document and generate analysis information including a dependency relation that indicates a semantic connection between words, and to perform a morphological analysis on each of sentences included in the proof document and generate morphological analysis information;
a detection unit configured to detect as a possible coined word character string a compound word having a nominal continuation relation by referring to the morphological analysis information, the nominal continuation relation being a relation of two or more consecutive words that can be nouns;
a database unit configured to store syntactic information on a correspondence between a sentence included in the entry document and the analysis information;
a retrieval unit configured to retrieve whether or not a dependency relation sentence exists, the dependency relation sentence including component words of the possible coined word character string as case elements and having a dependency relation other than the nominal continuation relation between the component words, and to determine the possible coined word character string as a coined word if the dependency relation sentence exists; and
a display unit configured to display a message including the coined word.

2. The apparatus according to claim 1, wherein the detection unit detects as the possible coined word character string a consecutive compound word in which two or more words that are nouns or sa-hen nouns, when the proof document is in Japanese.

3. The apparatus according to claim 1, wherein the detection unit detects as the possible coined word character string a consecutive compound word having two or more words which can be interpreted as nouns and also as a noun and a verb, when the proof document is in Chinese.

4. The apparatus according to claim 1, wherein the retrieval unit retrieves the dependency relation sentence having one or more of the component words as a case element of a particle and having a dependency relation other than the nominal continuation relation between the component words, when the proof document is in Japanese.

5. The apparatus according to claim 1, wherein the retrieval unit retrieves the dependency relation sentence having one or more of the component words as a case element of a verb and having a dependency relation other than the nominal continuation relation between the component words, when the proof document is in Chinese.

6. The apparatus according to claim 1, wherein the display unit displays an alert message including the coined word and the dependency relation sentence.

7. The apparatus according to claim 1, further comprising a management unit configured to store in the syntactic information database the syntactic information that includes proof information indicating whether the sentence included in the entry document has been proofed.

8. The apparatus according to claim 7, wherein the detection unit fails to detect as a coined word the possible coined word character string when the proof information of the dependency relation sentence indicates that the dependency relation sentence has been proofed.

9. The apparatus according to claim 1, wherein the database unit stores a tree structure including cases and head words, and
the retrieval unit retrieves a dependency relation between the component words by referring to the tree structure.

10. A document proofing support method comprising:
receiving input of one of at least one proof document and at least one entry document, the proof document that includes one or more sentences that is to be subjected to a proofing process, the entry document that includes one or more sentences that is to be subjected to an entry process;
generating analysis information including a dependency relation that indicates a semantic connection between words by performing a morphological analysis, a syntactic analysis and a dependency analysis on the sentence included in the entry document, and generating morphological analysis information by performing a morphological analysis on the sentence included in the proof document;
detecting as a possible coined word character string a compound word having a nominal continuation relation by referring to the morphological analysis information, the nominal continuation relation being a relation of two or more consecutive words that can be nouns;
preparing a syntactic information database unit to store syntactic information on a correspondence between a sentence included in the entry document and the analysis information are associated with each other;
retrieving whether or not a dependency relation sentence exists, the dependency relation sentence that includes component words of the possible coined word character string as case elements and has a dependency relation other than the nominal continuation relation between the components words, and determining the possible coined word character string as a coined word if the dependency relation sentence exists; and
displaying a message that includes the coined word.

11. A non-transitory computer readable medium including computer executable instructions, wherein the instructions, when executed by a processor, cause the processor to perform a method comprising:
receiving input of one of at least one proof document and at least one entry document, the proof document that includes one or more sentences that is to be subjected to a proofing process, the entry document that includes one or more sentences that is to be subjected to an entry process;
generating analysis information including a dependency relation that indicates a semantic connection between words by performing a morphological analysis, a syntactic analysis and a dependency analysis on the sentence included in the entry document, and generating morphological analysis information by performing a morphological analysis on the sentence included in the proof document;
detecting as a possible coined word character string a compound word having a nominal continuation relation by referring to the morphological analysis information, the nominal continuation relation being a relation of two or more consecutive words that can be nouns;
preparing a syntactic information database unit to store syntactic information on a correspondence between a sentence included in the entry document and the analysis information are associated with each other;
retrieving whether or not a dependency relation sentence exists, the dependency relation sentence that includes component words of the possible coined word character string as case elements and has a dependency relation other than the nominal continuation relation between the components words, and determining the possible coined word character string as a coined word if the dependency relation sentence exists; and
displaying a message that includes the coined word.

* * * * *